April 5, 1960 S. W. WALKER 2,931,711
FLUIDIZED BED REACTOR WITH INTERNAL
TUBE STRUCTURE DESIGN
Filed May 31, 1955 5 Sheets-Sheet 1

INVENTOR.
SCOTT W. WALKER
BY
ATTORNEY

*INVENTOR.*
SCOTT W. WALKER
BY
*ATTORNEY*

April 5, 1960  S. W. WALKER  2,931,711
FLUIDIZED BED REACTOR WITH INTERNAL
TUBE STRUCTURE DESIGN
Filed May 31, 1955  5 Sheets-Sheet 4

INVENTOR.
SCOTT W. WALKER
BY
ATTORNEY

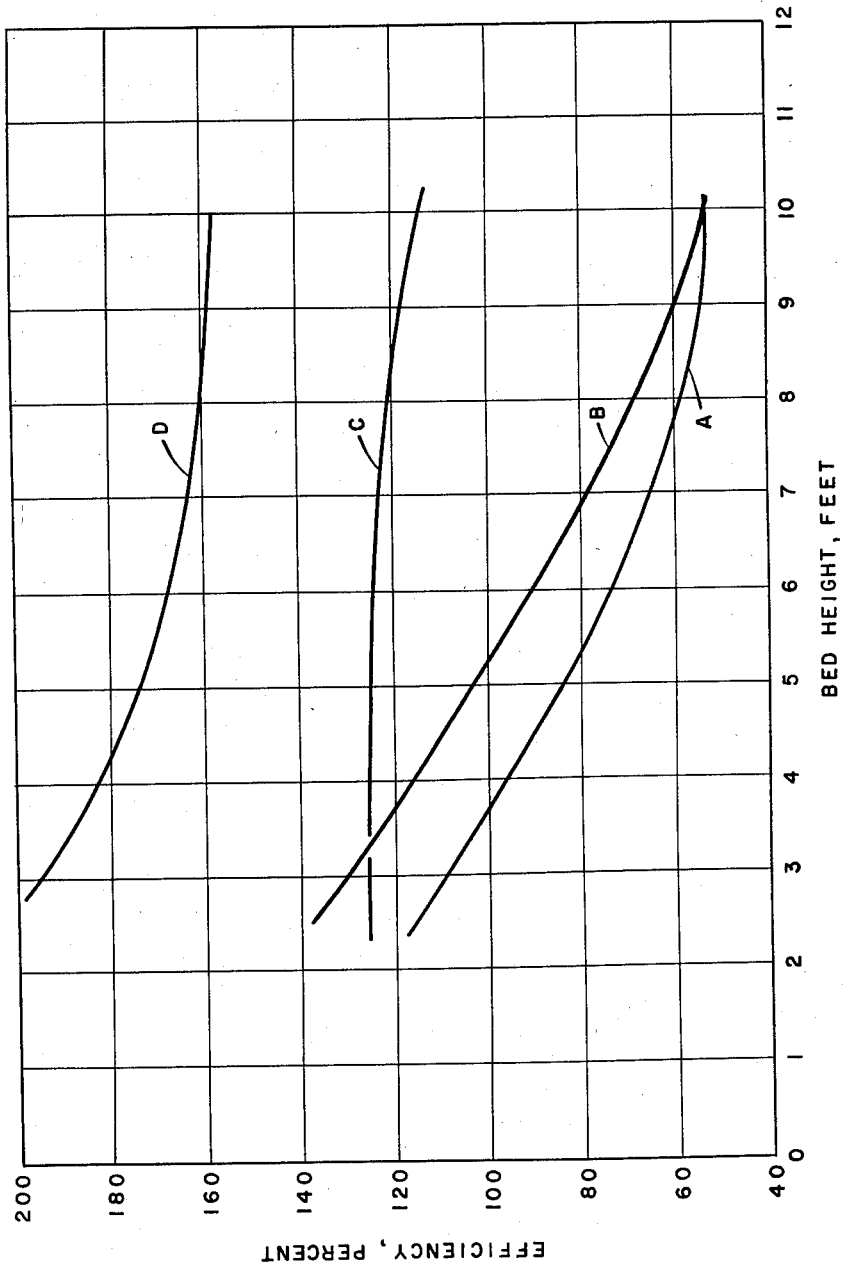

United States Patent Office 2,931,711
Patented Apr. 5, 1960

2,931,711

FLUIDIZED BED REACTOR WITH INTERNAL TUBE STRUCTURE DESIGN

Scott W. Walker, Tulsa, Okla., assignor to Pan American Petroleum Corporation, a corporation of Delaware Application May 31, 1955, Serial No. 512,147

11 Claims. (Cl. 23—288)

The present invention relates to a novel reactor design adapted to handle fluidized systems. More particularly, it is concerned with a novel reactor design whereby improved gas-solids contact in such systems can be effected. While the reactor design of my invention has a wide variety of applications, insofar as fluidized systems are concerned, I have found it to be particularly applicable to the synthesis of hydrocarbons from carbon monoxide and hydrogen in the presence of a fluidized catalyst.

It has been observed that, although it is relatively easy to achieve good conversion of carbon monoxide to useful products when reacted with hydrogen under synthesis conditions in a reactor of small diameter, e.g., 2 inches, the conversion drops off very rapidly as the diameter of the reactor is increased. Thus, for example, in a pilot plant reactor 2 inches in diameter and approximately 20 feet in length, total feed carbon monoxide conversions of from 85 to 90 percent are secured, while with a reactor designed for commercial operations, i.e., 16 feet in diameter by 20 feet in length, the total feed carbon monoxide conversion is found to decrease to about 45 to 55 percent.

From my observations, I believe that the principal factor in this sharp difference in operating efficiency, as the diameter of the reactor increases, is the failure to achieve adequate gas-solids contacting under such conditions. This undesirable condition in reactors of larger diameter I believe to be due to the formation of large gas bubbles in the bed of fluidized catalyst, thereby creating a relatively small catalyst surface to gas volume ratio which means that the gaseous reactants are able to contact only a comparatively small portion of the total catalyst present in the reactor. Also, channeling of the gas through unfluidized portions of the catalyst bed tends to occur which diminishes further the possibility of favorable gas-solids contact during synthesis.

Accordingly, it is an object of my invention to provide a reactor design adapted for commercial operation capable of promoting good gas-solids contact, primarily by the maintenance of a fluidized catalyst bed having a substantially uniform density throughout the bed.

In accordance with my invention, improved gas-solids contacting is achieved by the use of spaced horizontal tubes arranged substantially throughout the section of the reactor which is normally occupied by the fluidized bed of catalyst. For example, the individual layers or groups of horizontal tubes, as contemplated by my invention, may be placed in each group in such a manner so as to define a configuration which, when looking up or down through the aforesaid groups, has a latticework-like appearance. Vertical tubes may pass through a plurality of the straight uninterrupted passageways of the latticework. Such tubes may be employed for heat exchange purposes or a portion of them need not be filled with heat transfer material but may be utilized for the sole purpose of aiding fluidization in operation of the reactor. The vertical tubes may be arranged in substantially any fashion throughout the aforesaid arrangement of horizontal tubes.

Generally speaking, the preferred spacing between tubes of a given group may range from about 2 to about 10 inches and the distance between groups of tubes likewise is preferably from 2 to 10 inches. These distances, however, may vary widely with the nature of the feed employed, catalyst and operating conditions used.

The shape of the tubes employed in my novel reactor design is not necessarily critical, it being possible to use rod-like members which are round, elliptical, or air foil in shape. Also large gauge wire may be employed for this purpose. It is to be understood, however, that I intend to specifically exclude rods having sharp edges or corners owing to the tendency of such structures to favor catalyst hang-up or local clogging in regions of the reactor where rods of this type are present. Accordingly, the expression "rod-like members" or "tubes," appearing in the claims, is to be construed as specifically excluding members having square corners or edges.

While the tubes employed to make up the aforesaid latticework preferably should be relatively small in diameter, they, of course, should be of sufficient size to give them the required structural strength. Generally, rods of from ¼-inch to about 2 inches in diameter will be found to be adequate in this regard. Depending on the operating conditions, rods having diameters lying outside of this range may be satisfactory.

For a better understanding of my invention, reference is made to the accompanying drawings in which Figure 1 is primarily a sectional view of a reactor design illustrating one embodiment of the invention. Figures 2 to 7, 9 and 10 illustrate various types of tube arrangements, i.e., design of reactor internals contemplated by my invention.

Referring again to Figure 1, a vertical reactor shell 2 may be a cylindrical pressure vessel 16 to 20 feet in diameter and from 20 to 25 feet high, the ends of the reactor being provided with hemispherically shaped caps or closures welded to the walls of the reactor. Grid 4 is rigidly mounted to the walls of the reactor and contains holes through which reactant gases pass into reaction zone 8. Tube trays 10 are mounted to the vessel walls. Each tray consists essentially of two layers of tubes 12 and 14, the tubes 12 being equally spaced from one another and being at right angles to tubes 14. The specific structure of these internals is more clearly illustrated by Figure 3. Feed gas is supplied through line 16 via lateral branch inlets 18 and 20, both of which may receive total feed, or one may receive fresh feed while the other handles the recycle gas. The lower end of line 16 has a flange 22, adapted to receive a closure 24. Gaseous reaction products are withdrawn from the reactor through line 26 after passing over cooling tubes 28. Coolant inlets, such as bustle rings 30, are provided adjacent the upper portion of the reactor. Coolant conduits 32 communicate between a coolant supply source and bustle rings 30. A plurality of cooling coils 28 is provided within the reaction chamber. These coils communicate between the coolant inlet means and that portion of the chamber above plate 34. Coils 28 preferably extend downwardly from the point of communication with the coolant inlet into the lower portion of the reaction chamber at which point they make a return bend and extend upwardly through plate 34. The heat transfer liquid may then be removed from the system through conduit 36. When it is desired to remove catalyst from the reactor, line 26 is closed and manhole cover 38 is removed. The catalyst can then be blown out by introduction into the reactor of a suitable gas such as, for example, natural gas.

Figure 4:
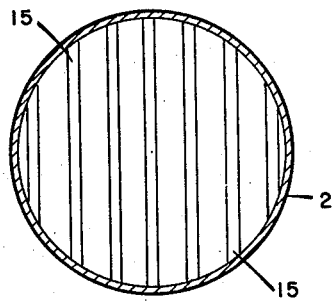
Figure 5:
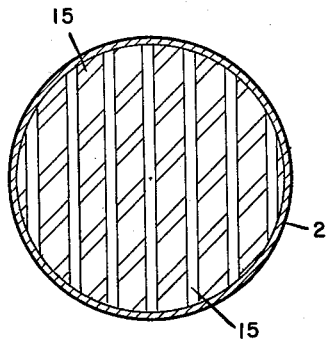

Figure 4 is still another section or tray design which may be used in the reactor. This particular embodiment, however, has only a single row of parallel tubes 15 or a plurality of such trays may, if desired, be vertically spaced within the reaction zone to form a configuration similar to that shown in Figure 5 merely by changing, to the extent required, the direction of the tubes in any given tray.

Figure 3:
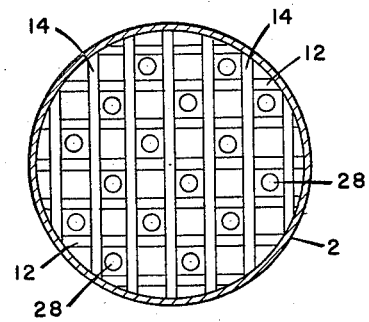
Figure 3 illustrates an arrangement of cooling tubes which may be employed in combination with the design of internals shown in Figure 2.
Figure 6:
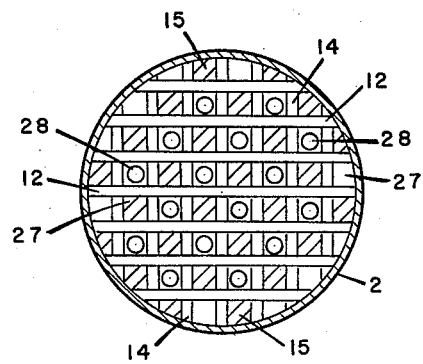

Figure 6 is another design which may be employed in the reactor and is obtained by vertically spacing alternate trays therein having the configuration of Figures 3 and 4. The direction of the tubes 15 in Figure 6 may be changed in subsequent trays of the structure shown in Figure 4 so as to partially block passageways 27.

Figure 1:
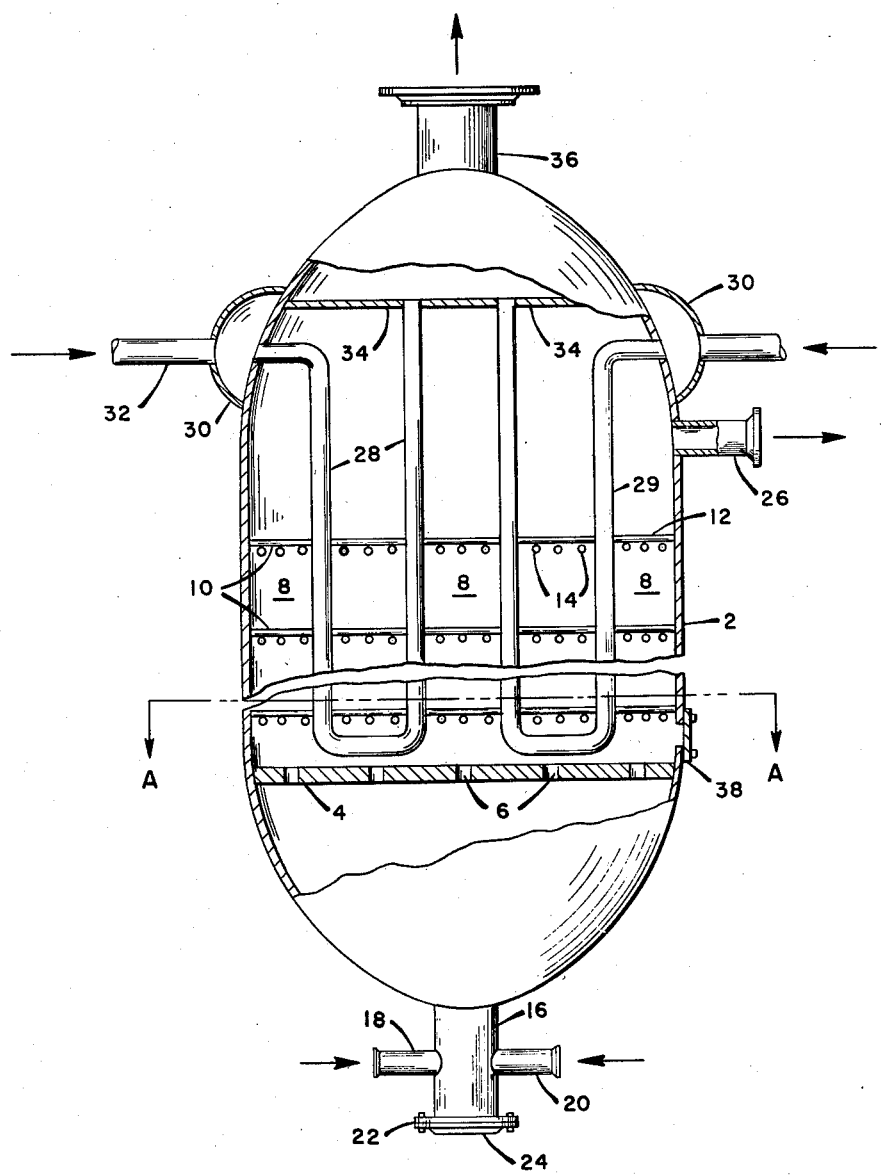
Figure 2:
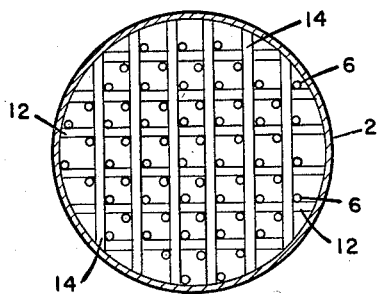
Figure 2 is a section taken along line A—A of Figure 1, showing the arrangement of tubes making up the reactor internals (minus cooling tubes), together with a particular distribution of grid holes that may be used, although the grid hole arrangement is ordinarily not considered critical.
Figure 7:
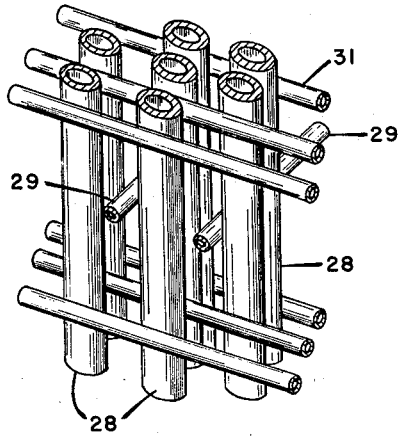

Figure 7 is an elevational view showing a reactor internals design similar to those contemplated, for example, in Figures 2 and 3, except that the horizontal members consist of vertically spaced single layers of tubes 29 and 31.

Figure 8:
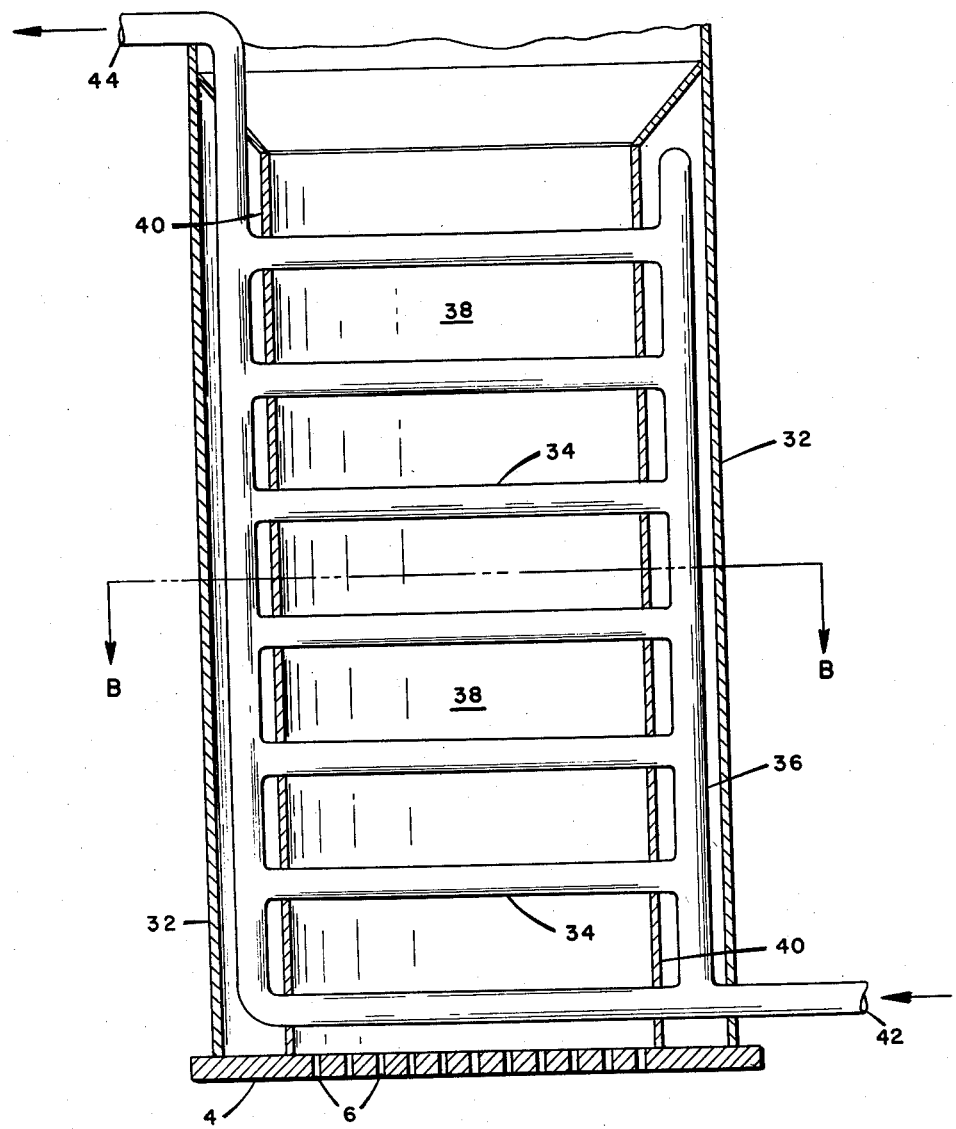

Figure 8 is a diagrammatic view of another reactor design, with the upper portion thereof broken away, employing internals of the type covered by my invention in which a relatively light outer shell 32 houses a suitable cooling or heat exchange structure composed of horizontal tubes 34 communicating with headers 36. This structure serves to control the temperature of the reaction occurring within reaction zone 38, defined generally by inner shell 40. Exchange liquid enters at 42 and is withdrawn from the system through the exit port 44. The fluid may then be sent to a conventional cooling or heating means depending on the nature of the reaction being effected in reaction zone 38. In the case of reactions conducted in fluidized catalyst beds wherein the temperature of the reaction zone is controlled by external means, e.g., preheating the charge to a catalytic cracking unit, heat transfer liquid need not be introduced into said system but the latter may be used primarily to promote better contact of the vaporized charge with the fluidized catalyst particles.

Figure 9:
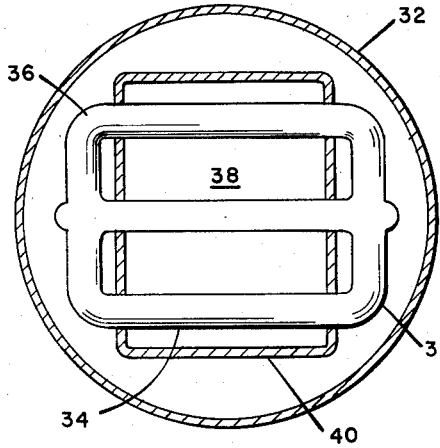

Figure 9 is a sectional view taken along line B—B of Figure 8 showing in further detail the structure of the heat exchange system described and its arrangement with respect to outer shell 32 and inner shell 40.

Figure 10:
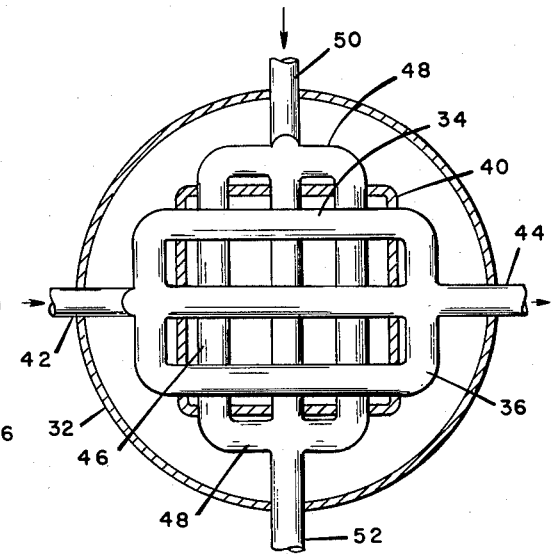

Figure 10 is a section view illustrating a configuration of tubes somewhat similar to that shown in Figure 9 with the exception that a second set of horizontal tubes 46 and headers 48 is provided. This second group of horizontal tubes is arranged in a direction perpendicular to that of the original set. The angle defined by the intersection of these two groups of tubes may vary widely, e.g., from a value greater than 0° up to about 90°. Heat transfer liquid is handled by inlet and exit ports 50 and 52, respectively.

Figure 11:
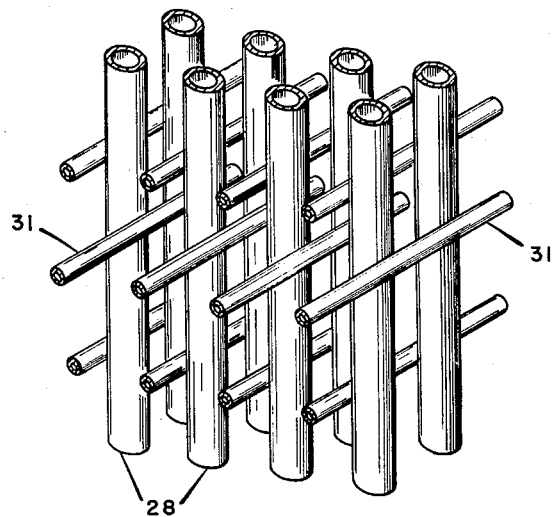

Figure 11 is a fragmentary elevational view, partly in section, showing an arrangement of reactor internals embodying a series of vertically spaced groups of horizontal tubes wherein the tubes of each group are spaced in staggered relationship with respect to the horizontal tubes in an adjacent group or groups.

In order to demonstrate further the advantage of my improved reactor design with respect to procurement of better gas-solids contacting, a series of runs was made in which different types of reactor internals were employed and the efficiency of the various internals designs compared. In these runs, air was mixed with a small amount of oxygen and ozone to give a final mixture containing 0.03 mol percent ozone. This mixture was then fed to a cylindrical reactor about 15 feet high and 30 inches in diameter containing iron mill scale catalyst. On contact of the ozone-containing mixture with the fluidized finely divided iron catalyst, ozone decomposes into oxygen. The tail gas from the unit was then analyzed to determine the ozone content thereof. The efficiency of the particular system under investigation was then established by determining what percentage of the original ozone had been converted into oxygen. The expressions "efficiency" and "contacting efficiency," as used herein, refer to the amount of catalyst required in a given reactor at a fixed linear velocity to secure a specified conversion of ozone to oxygen.

A comparison of the gas-solids contacting efficiency in a fluidized system using reactor internals of various designs, including a design contemplated by my invention, is shown by reference to the curves appearing in Figure 12. Curve A represents the plot obtained by operation of the above-mentioned 30-inch reactor under the conditions generally described above. In this particular run, the reactor had no internals.

Curve B indicates the contacting efficiency of the system when vertical tubes were inserted in the reactor. In this case, 26 tubes 15 feet in length and 2 inches O.D. were arranged on a perforated grid in a triangular pattern with the distance from the tubes, center-to-center, being 5 inches.

In the run on which curve C is based, 7 hexagonally-shaped compartments 10 feet high were built around 10 2-inch O.D. vertical tubes 15 feet in length arranged in a triangular pattern on 8½ inch centers.

Curve D represents the contacting efficiency obtained by using reactor internals designed in accordance with my invention. In this particular run each tray of cross members or tubes consisted of 5 2-inch O.D. tubes spaced 5 inches apart. There were 27 of these trays vertically spaced 4⅜ inches apart (center-to-center) to give an over-all height of 10 feet. The trays were arrranged so that the tubes therein were offset from those in the adjacent tray or trays so as to give an appearance similar to that produced by an arrangement of the type shown in Figures 2, 3, or 7.

In all runs linear velocities of 0.2, 0.3 and 0.5 foot per second were employed with static catalyst bed heights of 3, 6 and 10 feet, respectively. The plots shown in Figure 12 are based on an average of the above-mentioned range of linear velocities.

From the curves presented, using as a reference curve A which shows that the reactor with no internals operated at an efficiency of 100 percent at a bed height of 3.75 feet, it is seen that at the same bed height substantially higher conversions of ozone to oxygen were obtained in the case of the runs represented by curves B, C and D with curve D showing results outstandingly better than any of the others. Stated in another manner, it will be seen that less catalyst was required with reactors employing internals to achieve the same efficiency (conversion) secured in the empty reactor run (curve A). This is true because the density of the catalyst bed decreases with height. Thus, while in all cases it may be seen that as the bed height increased, the gas-solids contacting efficiency decreased, the efficiency of applicant's reactor internals design (see curve D) was, at all bed heights, considerably superior to any of the other designs investigated.

Although reactor designs of the type described above are contemplated for use in the hydrocarbon synthesis process, it will likewise be apparent that the apparatus of my invention may be adapted to any process involving the use of a fluidized catalyst bed wherein it is desired to improve the gas-solids contacting efficiency.

Other modifications of the designs disclosed above will be apparent to those skilled in the art. Thus, where it is not considered necessary or desirable to place heat transfer tubes in the reactor itself, the control of temperature within the reaction zone may be accomplished by the use of a suitable heat transfer liquid circulating exteriorly of the reactor through a jacket therefor.

I claim:

1. Apparatus adapted for use in effecting reactions involving the contacting of vaporous reactants with fluidized solids comprising a reaction chamber, a plurality of groups of tubes spaced along substantially the entire longitudinal axis of said chamber, said groups being at right angles of said axis and having a cross-sectional area approximately equal to that of said chamber, each of said groups having a plurality of spaced tubes therein, said tubes in each of the intermediate groups being positioned in a direction different from said tubes in the groups adjacent a given intermediate group to define both uninterrupted passageways and tortous paths through which at least a major portion of said reactants must pass in flowing through said chamber, and a plurality of spaced heat exchange tubes extending through said uninterrupted passageways and running parallel with said axis, the distance between said tubes in a given group being substantially equal to the distance between adjacent groups of said tubes.

2. Apparatus adapted for use in effecting reactions involving the contacting of vaporous reactants with fluidized solids comprising a reaction chamber, a series of groups of tubes spaced along substantially the entire longitudinal axis of said chamber each of said groups having a plurality of tubes spaced apart and substantially parallel with one another, said groups being at right angles with said axis, a conduit connecting all of said groups whereby the latter are placed in communication with one another, inlet means for passing a heat transfer medium through said conduit and outlet means for withdrawing said medium from said tubes, the distance between said tubes in a given group being substantially equal to the distance between adjacent groups of said tubes.

3. Apparatus adapted for use in effecting reactions involving the contacting of vaporous reactants with fluidized solids comprising a reaction chamber, a first series of groups of tubes spaced along substantially the entire longitudinal axis of said chamber, each of said groups having a plurality of tubes spaced apart and substantially parallel with one another, said groups being at right angles with said axis, a conduit connecting all of said groups in said first series whereby said groups are placed in communication with one another, a second series of spaced groups of tubes in said chamber likewise spaced along substantially the entire longitudinal axis of said chamber and at right angles therewith, each of said groups of said second series having a plurality of tubes spaced apart and substantially parallel with one another, the groups of tubes of said second series being spaced so that each group of tubes of said second series lies in a space between two adjacent groups of tubes of said first series, a conduit connecting all of said groups of said second series whereby the groups of said second series are placed in communication with one another, means for passing a heat transfer medium through said conduits, and outlet means for withdrawing said medium from said tubes, the distance between said tubes in a given group being substantially equal to the distance between said given group and groups of tubes adjacent thereto.

4. Apparatus adapted for use in effecting a reaction involving the contacting of vaporous reactants with fluidized solids and comprising a substantially vertical shell having a perforated grid located in the lower portion thereof, the combination comprising a reaction chamber extending substantially the length of said shell, a first series of groups of horizontal tubes vertically spaced substantially throughout the entire length of said chamber, each of said groups having a plurality of tubes spaced apart and substantially parallel with one another, a conduit connecting all of said groups in said first series whereby said groups are placed in communication with one another, a second series of vertically-spaced groups of horizontal tubes disposed substantially throughout the entire length of said chamber, each of said groups of said second series having a plurality of tubes spaced apart and substantially parallel with one another, the groups of tubes of said second series being spaced vertically so that each group of tubes of said second series fits into the space between two adjacent groups of tubes of said first series, a conduit connecting all of said groups of said second series whereby the groups of said second series are placed in communication with one another, inlet means for passing a heat transfer medium through said conduits, and outlet means for withdrawing said medium from said tubes, the groups of tubes of said second series being positioned in a direction such that the angle defined by the intersection of the tubes of said first series with the tubes of said second series ranges from a value greater than 0° to about 90°, the distance between said tubes in a given group being substantially equal to the distance between adjacent groups of horizontal tubes.

5. The apparatus of claim 4 in which the angle defined by the intersection of tubes in said first and second series of groups is about 90°.

6. Apparatus adapted for use in effecting reactions involving the contacting of vaporous reactants with fluidized solids comprising a generally cylindrical reaction chamber, a first series of groups of tubes, said groups being spaced along substantially the entire longitudinal axis of said chamber and at right angles with said axis, each of said groups having a plurality of tubes spaced apart and substantially parallel with one another, a second series of groups of tubes spaced along substantially the entire longitudinal axis of said chamber and at right angles with said axis, each of said groups of said second series having a plurality of tubes spaced apart and substantially parallel with one another, the groups of tubes of said second series being spaced so that each one of the groups in said second series lies in the space between two adjacent groups of tubes of said first series, a conduit connecting all of said groups of said first and second series whereby the tubes in both of said series are placed in communication with one another, inlet means for passing a heat transfer medium through said conduit, and outlet means for withdrawing said medium from said tubes, the groups of tubes of said second series being positioned in a direction such that the angle defined by the intersection of the tubes of said first series with the tubes of said second series ranges from a value greater than 0° to about 90°, the distance between said tubes in a given group being substantially equal to the distance between adjacent groups of said tubes.

7. Apparatus adapted for use in effecting reactions involving the contacting of vaporous reactants with fluidized solids comprising a generally cylindrical reaction chamber, a first series of groups of tubes spaced along substantially the entire longitudinal axis of said chamber and at right angles with said axis, each of said groups having a plurality of tubes spaced apart from one another, a conduit connecting all of said groups in said first series whereby such groups are placed in communication with one another, a second series of groups of tubes spaced along substantially the entire longitudinal axis of said chamber and at right angles with said axis, each of said groups of said second series having a plurality of tubes spaced apart from one another, the groups of tubes of said second series being spaced so that each group of tubes of said second series lies in the space between two adjacent groups of tubes of said first series, a conduit connecting all of said groups of said second series whereby the groups of said second series are placed in communication with one another, inlet means for passing a heat transfer medium through said conduits, and outlet means for withdrawing said medium from said tubes, the distance between said tubes in a given group being substantially equal to the distance between adjacent groups of said tubes.

8. Apparatus adapted for use in effecting reactions involving the contacting of vaporous reactants with fluidized solids having in combination a substantially vertical shell, a reaction chamber within said shell extending substantially the length thereof, a first series of vertically-spaced groups of horizontal tubes running substantially throughout the entire length of said chamber, each of said groups having a plurality of tubes spaced apart from one another, a second series of vertically-spaced groups of horizontal tubes disposed substantially throughout the entire length of said chamber, each of said groups of said second series having a plurality of tubes spaced apart from one another, a common conduit connecting all of said groups of said first and second series whereby both of said series are placed in communication with one another, inlet means for passing a heat transfer medium through said conduit, and outlet means for withdrawing said medium from said tubes, the distance between said tubes in a given group being substantially equal to the distance between adjacent groups of horizontal tubes.

9. In a reaction vessel adapted for use in effecting reactions involving the contacting of vaporous reactants with fluidized solids the combination comprising a reaction chamber within said vessel and a plurality of groups of tubes disposed along substantially the entire longitudinal axis of said chamber, said groups of tubes being secured to the walls of said vessel at right angles with said axis and spaced from about 2-inches to about 10-inches apart from one another, said tubes in each of said groups likewise being from about 2-inches to about 10-inches apart from one another and positioned in the same plane but spaced in a staggered relationship with respect to the tubes of adjacent groups, thereby defining a tortuous path through which said reactants must pass, the distance between said tubes of a given group being substantially equal to the distance between said adjacent groups.

10. Apparatus comprising a vessel having openings at both ends thereof, a reaction chamber within said vessel extending substantially the length of said vessel, a plurality of vertically-spaced groups of tubes disposed substantially throughout the entire length of said chamber, each of said groups having a plurality of horizontally spaced tubes, said groups being spaced from about 2-inches to about 10-inches from one another, said tubes in each of said groups being likewise spaced from about 2-inches to about 10-inches apart from one another, whereby a structure is defined in which the distance between each of said groups is substantially the same as the distance between tubes in each of said groups.

11. Apparatus comprising a vessel having openings at both ends thereof, a reaction chamber within said vessel extending substantially the length of said vessel containing a plurality of vertically spaced groups of horizontal tubes disposed substantially throughout the entire length of said chamber, said groups being spaced from about 2-inches to about 10-inches apart from one another and said tubes in each of said groups being likewise spaced from about 2-inches to about 10-inches from one another, said tubes in each of the intermediate groups being positioned in substantially the same direction but spaced in staggered relationship with respect to said tubes of adjacent groups, thereby defining a tortuous path through said vertically spaced groups wherein the distance between each of said groups is substantially the same as the distance between tubes in each of said groups.

References Cited in the file of this patent

UNITED STATES PATENTS

| | | |
|---|---|---|
| 833,847 | Pietsch | Oct. 23, 1906 |
| 1,037,987 | Riblet | Sept. 10, 1912 |
| 2,226,578 | Payne | Dec. 31, 1940 |
| 2,446,925 | Hemminger | Aug. 10, 1948 |
| 2,529,503 | Kimball et al. | Nov. 14, 1950 |
| 2,777,760 | Dineen | Jan. 15, 1957 |

FOREIGN PATENTS

| | | |
|---|---|---|
| 1,089,281 | France | Sept. 29, 1954 |